June 19, 1951 J. H. GEISSE 2,557,275
CROSS WIND AIRPLANE UNDERCARRIAGE
Filed Feb. 28, 1950 3 Sheets-Sheet 1
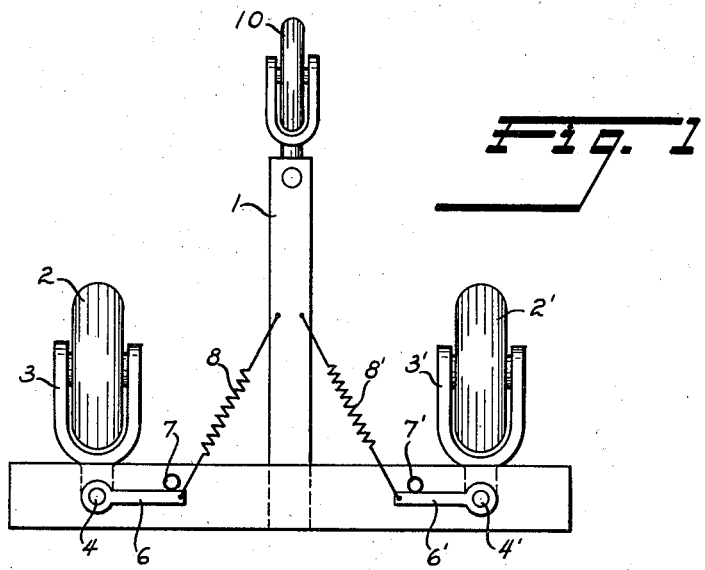
Fig. 1
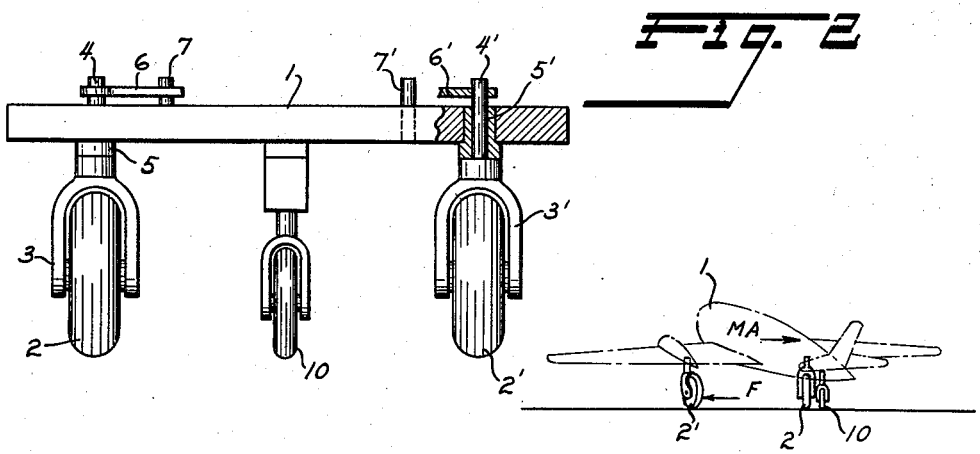
Fig. 2
Fig. 3
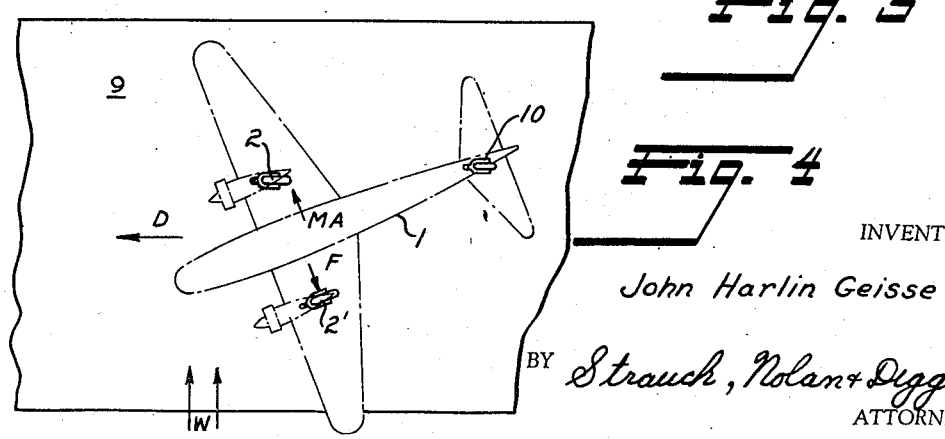
Fig. 4
INVENTOR
John Harlin Geisse
BY Strauch, Nolan & Diggins
ATTORNEYS June 19, 1951  J. H. GEISSE  2,557,275
CROSS WIND AIRPLANE UNDERCARRIAGE
Filed Feb. 28, 1950  3 Sheets-Sheet 2
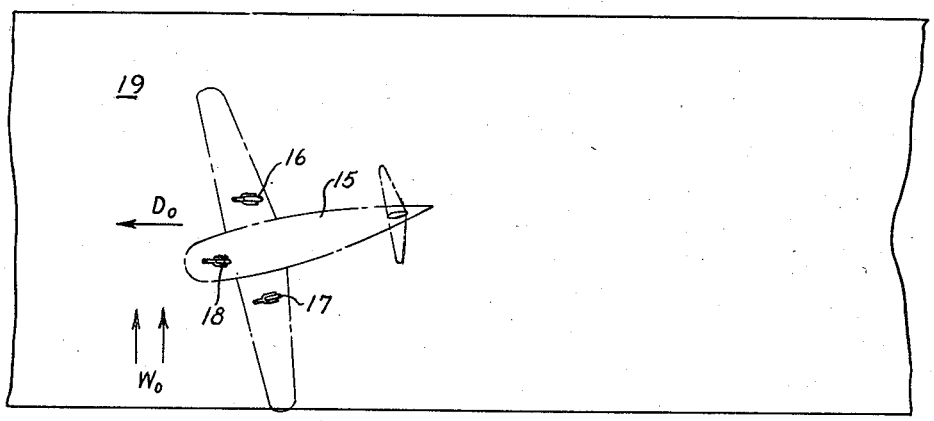
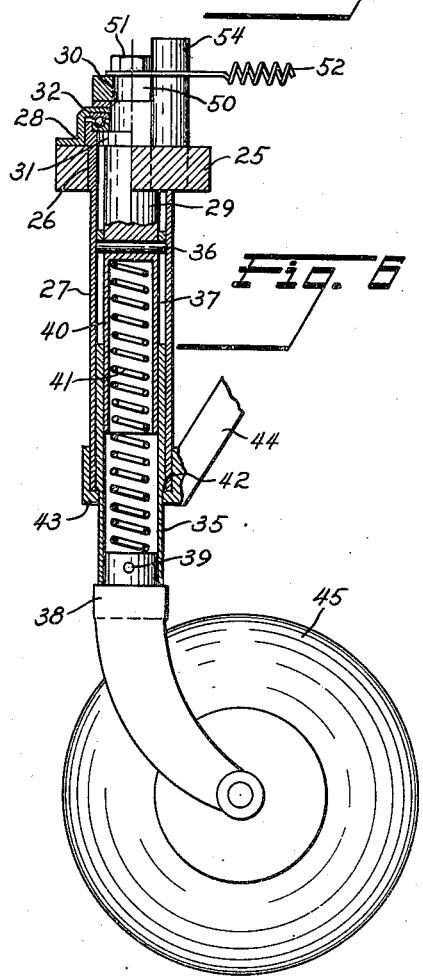
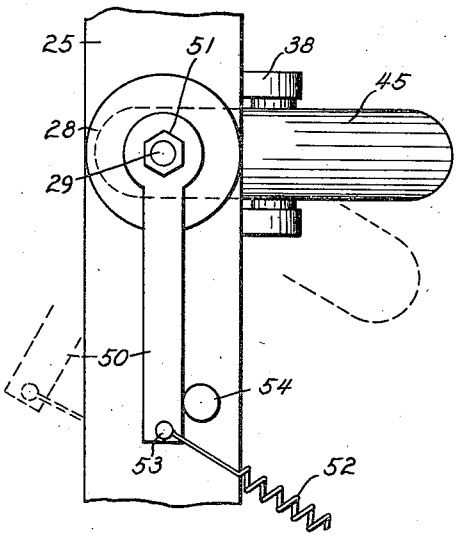
INVENTOR
John Harlin Geisse
BY Strauch, Nolan & Diggins
ATTORNEYS June 19, 1951  J. H. GEISSE  2,557,275
CROSS WIND AIRPLANE UNDERCARRIAGE
Filed Feb. 28, 1950  3 Sheets-Sheet 3

INVENTOR
John Harlin Geisse
BY *Strauch, Nolan & Diggins*
ATTORNEYS

Patented June 19, 1951

2,557,275

UNITED STATES PATENT OFFICE 2,557,275

CROSS WIND AIRPLANE UNDERCARRIAGE

John Harlin Geisse, Washington, D. C.

Application February 28, 1950, Serial No. 146,708

15 Claims. (Cl. 244—100)

The present invention relates to undercarriages or landing gear for airplanes and more particularly to undercarriages or landing gear for cross wind landings.

The usual airplane is provided with two main wheels, are on each side of the axis of the airplane and a third wheel in the nose or tail of the airplane substantially on the axis. When the airplane comes in for a cross wind landing, the axis is at an angle to the direction of movement and if the wheels are fixed parallel to the axis of the airplane, so that the wheels strike the ground at an angle, an accident is probable. This difficulty was recognized early in airplane history and numerous efforts have been made to provide suitable undercarriages or landing gear since before 1908. In attempting to overcome the difficulties of cross wind landing, a variety of constructions have been suggested and tried but none of these prior constructions has provided an adequate solution.

In most of the prior art constructions, all three wheels of the landing gear or undercarriage have been turned in the direction of ground movement so that one of the main wheels is inclined toward the axis of the airplane and the other inclined away from the axis. This has been done manually by providing controls whereby the pilot can set the wheels at the proper angle or automatically by providing a caster type mounting for the wheels. The former construction requires costly controls and imposes further duties on the pilot while the latter requires additional mechanism to hold the wheels in position for normal landings and this additional mechanism introduces new difficulties especially in handling and controlling the airplane on the ground.

I have found that it is not necessary to incline both main wheels simultaneously relative to the axis of the airplane and that the difficulties of cross wind landings can be overcome by permitting the main wheels to turn outward away from the airplane axis while preventing them from turning inward toward the axis. With such a wheel mounting, the downwind wheel can turn to correspond to the angle at which the airplane is landing while the upwind wheel remains parallel to the axis. The fact that the second or upwind wheel is at an angle to the direction of movement is unimportant since the upwind side of the airplane tends to lift and thus reduces the weight or load on the upwind wheel when the drag due to the angular position of the upwind wheel tends to turn the airplane toward the wind. An airplane provided with such landing gear or undercarriage may be handled on the ground as easily as a conventional airplane so that the difficulties introduced by prior art constructions are overcome.

One of the objects of the present invention is to provide a landing gear or undercarriage for aircraft which will permit safe and satisfactory cross wind landings.

Another object is to provide an airplane landing gear or undercarriage in which the main wheels may be turned outward away from the axis of the airplane but not inward toward the axis.

Another object is to provide an airplane undercarriage in which the main wheels may turn relative to the airplane axis and normally tend to turn inward toward the axis but are prevented from turning inward toward said axis.

Another object is to provide an airplane undercarriage or landing gear having main wheels which may turn relatively to the axis of the airplane, in which the turning of the wheels inward toward said axis is positively prevented and the turning of the wheels outward away from the axis is yieldably resisted.

These and other objects and advantages reside in novel features of construction, arrangement and combination of parts as will hereinafter be more fully set forth and pointed out in the appended claims.

Referring to the drawing:

Figure 1 is a diagrammatic top plan view of an undercarriage or landing gear according to my invention;

Figure 2 is a front elevation of the undercarriage or landing gear of Figure 1 with parts in section;

Figure 3 is a rear view of an airplane equipped with my undercarriage or landing gear showing the operation during a cross wind landing;

Figure 4 is a top plan view of the airplane shown in Figure 3;

Figure 5 is a top plan view similar to Figure 4 in which the airplane is equipped with tricycle landing gear;

Figure 6 is a side elevation with parts in section of a modified form of main wheel mounting;

Figure 7 is a fragmentary top plan view of the wheel mounting shown in Figure 6;

Figure 8:
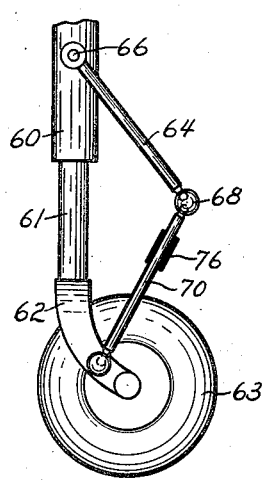
Figure 8 is a side elevation of another modified form of main wheel assembly.

The landing gear or undercarriage of the present invention is applicable to both light and heavy airplanes and may be embodied in a tricycle type landing gear as well as the tail wheel type. In the drawing, I have illustrated application of my invention to both types of landing gear and to both light and heavy airplanes.

Figures 1 to 4 illustrate the application of my invention to an airplane having the tail wheel type of landing gear. In Figure 1, the airplane is indicated diagrammatically by the T shaped member 1, the cross bar representing the wings and the upright representing the fuselage structure. The main wheels 2 and 2' are mounted symmetrically on opposite sides of the axis of the airplane which runs through the center of the fuselage and the tail wheel 10 is mounted at the rear end of the fuselage substantially beneath the axis.

According to my invention, the main wheels 2 and 2' are mounted in forks 3 and 3' which are attached to spindles 4 and 4'. These spindles 4 and 4' are rotatably mounted in bearings 5 and 5' beneath the wings of the airplane 1. As shown in Figure 1, the forks 3 and 3' project downwardly and rearwardly from the spindles 4 and 4' so that the mounting is in effect a caster. Arms 6 and 6' are keyed on the spindles 4 and 4' respectively and springs 8 and 8' each secured at one end to the corresponding arm 6 and 6' and at the other end to a fixed part of the airplane structure, urge the wheels 2 and 2' inward toward the axis of the airplane. Fixed stops 7 and 7' engage the arms 6 and 6' when the wheels 2 and 2' are parallel to the airplane axis and prevent these wheels from turning inward toward the axis beyond this parallel position. Thus the wheels 2 and 2' are normally parallel to the airplane axis in position for a normal landing and may turn outward away from the axis when subject to side loads but are prevented from turning inward toward the axis by the stops 7 and 7'. As soon as the side load is removed, the springs 8 and 8' bring the wheels 2 and 2' into normal position. The tail wheel 10 has a conventional free caster mounting.

The operation of the landing gear of my invention is illustrated in Figures 3 and 4 where the airplane 1 is shown as landing on a strip 9 in a cross wind indicated by the arrows W. The cross wind W causes the airplane to yaw so that the axis is at an angle to the direction of movement indicated by the arrow D. When the wheels 2 and 2' touch the runway, the downward wheel 2 because of its caster mounting turns outward from the airplane against the relatively light spring 8 to a position parallel to the direction of movement and the fully castered tail wheel assumes a similar position. The upwind wheel 2' however is prevented from turning inward toward the airplane axis by the arm 6' and stop 7' so that the wheel 2' remains parallel to the axis and at an angle to the direction of movement D, as shown in Figures 3 and 4.

It is evident that there will be no substantial side load on the downwind wheel 2 but the side load F on the inside of the upwind wheel 2' will be proportional to the angle of yaw of the wheel 2' relative to the direction of movement D and to the weight supported by the upwind wheel 2'. The force F on the upwind wheel 2' tends to turn the airplane path to the left as shown in Figures 3 and 4 and sets up an equal force indicated by the arrow MA which passes through the center of gravity of the airplane which is necessarily above the wheel 2'. The force MA thus tends to raise the downwind wheel 2' and reduces the weight on the wheel 2'. The force F is thereby prevented from becoming sufficiently great to roll the airplane over. Since my invention neutralizes or eliminates the side load on one of the main wheels and limits the side load on the other, it will be manifest to one skilled in the art that airplanes equipped with undercarriages or landing gear embodying my invention can safely land with twice the amount of yaw permissible with a standard undercarriage and with the same or slightly less ground looping moment. It is also apparent that if a landing is attempted at more than twice the degree of yaw which would result in a ground loop with a conventional undercarriage with my undercarriage the curvature of the path would remain substantially constant and well within safe limits whereas with the conventional undercarriage landed at this degree of yaw, the radius of curvature of the path would progressively decrease until the airplane rolled over far enough for the downwind wing to contact the ground.

Figure 5 shows that my invention is equally applicable to airplanes having the tricycle type of landing gear. In Figure 5, an airplane 15 equipped with tricycle landing gear comprising main wheels 16 and 17 and a nose wheel 18, is shown landing on a landing strip 19 in a cross wind indicated by the arrows Wo. As in Figures 3 and 4, the nose wheel 18 and downwind wheel 16 are in the direction of movement Do while the upwind wheel 17 remains parallel to the airplane axis. The exact same forces and counter forces are set up as described in connection with the embodiment shown in Figures 3 and 4 with the result that the side load on the upwind wheel 17 is substantially eliminated.

My invention may be applied in a number of different ways and Figures 6 to 12 show three specific structures. These structures are shown as examples only and only one main wheel mounting is illustrated for each structure, it being understood that the other main wheel structure will be similar but with the castering operation reversed.

Figures 6 and 7 illustrate a spring type wheel mounting widely used in heavier airplanes. The wheel mounting shown is for a right wheel and corresponds to the mounting of wheel 2 in Figures 1 to 4 and the wheel 16 in Figure 5.

In the embodiment shown in Figures 6 and 7, 25 indicates a fixed part of the airplane which is provided with an opening 26 in which a suitable sleeve 27 is mounted. An annular retainer 28 is secured to the member 25 surrounding the opening 26 and a spindle 29 extends through the opening 26 and the opening 30 of the retainer 28 into the sleeve 27. The spindle 29 is freely rotatable in the retainer 28 and sleeve 27 and is provided with a shoulder 31 which engages an antifriction bearing 32 secured to the retainer 28.

A sleeve 35 is vertically slidable between the spindle 29 and sleeve 27 and a pin 36 extends transversely through the spindle 29 and into longitudinal slots 37 in the sleeve 35 to prevent relative rotation between the sleeve 35 and spindle 29. A fork 38 is non-rotatably secured at the bottom of the sleeve 35 by a pin 39 and the lower end of the spindle 29 is recessed as indicated at 40 to receive a coil spring 41 which bears against the fork 38 to urge the sleeve 35 downward. The downward movement of the sleeve 35 is limited by a shoulder 42 which engages an inward flange 43 on a brace or strut 44 fixed to the airplane. The fork 38 extends downwardly and rearwardly to provide a caster mounting for the wheel 45.

An arm 50 is keyed on the spindle 29 above the retainer 28 and held in position by a nut 51. This arm 50 extends inwardly toward the axis of the airplane and is urged in a counterclockwise direction by a spring 52 which is secured at one end to a pin 53 on the arm 50 and at the other end to a fixed part of the airplane, not shown. Counterclockwise movement of the spindle 29 would cause the wheel to nose inward toward the axis of the airplane but this movement is limited by a stop 54 secured on the fixed member 25 which stops further inward movement when the wheel 45 is parallel to the axis of the airplane. The wheel 45 is thus normally held parallel to the axis of the airplane and may nose outward away from the axis against the tension of spring 52 as indicated by the dotted lines in Figure 7 when subjected to side thrust but is prevented from turning inward toward the axis of the airplane by the arm 50 and stop 54.

Figure 9:
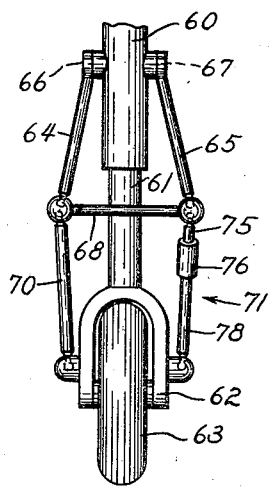
Figure 9 is a rear elevation of the main wheel assembly shown in Figure 8.
Figure 10:
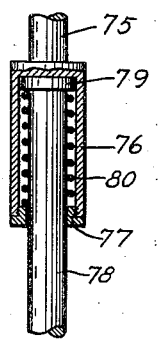
Figure 10 is an enlarged detail view of the extensible arm of the jack-knife mounting shown in Figures 8 and 9 with parts broken away to show internal structure.

Another form of wheel mounting suitable for the practice of my invention is illustrated in Figures 8, 9 and 10. The wheel mounting illustrated in these figures is for a left hand main wheel corresponding to the wheel 2' of Figures 1 to 4 and the wheel 17 of Figure 5. The right hand main wheel mounting of the undercarriage would be similar to the wheel mounting shown except that it would be free to caster in the opposite direction.

In the embodiment shown in Figures 8, 9 and 10, a sleeve 60 is fixed to the airplane and a second sleeve 61 is slidably telescoped therein. A fork 62, secured at the lower end of the sleeve 61, extends downwardly and rearwardly and carries a wheel 63 in a caster type mounting. A suitable spring, not shown, which may be similar to that shown in Figure 6, urges the sleeve 61 downward relative to sleeve 60 to form a spring suspension for the airplane.

The rotation of sleeve 61 relatively to sleeve 60 is controlled by a type of connection generally known as a jack-knife. This connection consists of two links 64 and 65 pivotally mounted at one end on horizontal pivots 66 and 67 respectively on the fixed sleeve 60. The other ends of the links 64 and 65 are pivotally connected to opposite ends of a horizontal bar 68. In the drawing I have shown the connection between links 64 and 65 and bar 68 as universal connections but these may be simple connections for pivotal movement on a horizontal axis.

A link 70 is pivotally connected at one end to the end of the bar 68 adjacent link 64 and at the other end to one side of the fork 62. Both connections of the link 70 permit universal movement. A fourth link indicated generally at 71 is universally connected at one end to the end of the horizontal bar 68 adjacent the link 65 and is universally connected at its other end to the side of the form 62 opposite the link 70.

The link 71 comprises a rod 75 connected at one end to the bar 68 and terminating in a sleeve 76 with an inturned flange 77. A second rod 78 secured at one end to the fork 62 extends into the sleeve 76 and terminates with a shoulder 79. A spring 80 surrounds the rod 78 between the flange 77 and shoulder 79.

Like the mountings of the previous embodiments, the wheel of this embodiment may caster in only one direction, away from the axis of the airplane. When the wheel 63 is subject to a side load from right to left in Figure 9 due to yaw in landing, the wheel 63 cannot nose inward toward the axis of the airplane because the end of rod 78 bears against the bottom of sleeve 76 and the linkage 64, 65, 70 and 71 prevents the fork 62 from nosing inward relative to sleeve 60 while permitting sleeves 60 and 61 to telescope against the spring not shown, to absorb shock. When side load is applied from left to right in Figure 9, the fork 62 can turn relative to the sleeve 60 because the link 71 is extensible. This turning is resisted by the spring 80 which tends to bring the wheel 63 back into parallelism with the axis of the airplane when the side load is removed.

As can be readily seen, when the fork 62 turns relative to the fixed sleeve 60, the angular relationship of the fork 62 and rod 68 will change. It is therefore necessary that the ends of the links 70 and 71 be universally connected to both the bar 68 and the fork 62.

Figure 11:
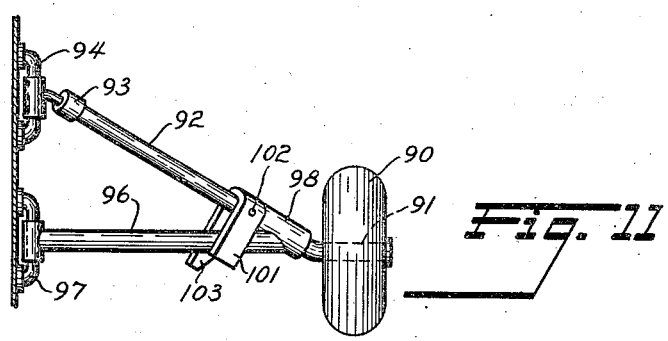
Figure 11 is a top plan view of a further modified form of main wheel mounting especially adapted for light airplanes.
Figure 12:
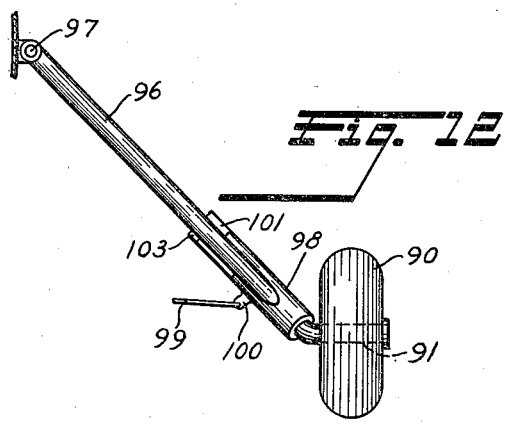
Figure 12 is a front elevation of the wheel mounting shown in Figure 11.

Figures 11 and 12 illustrate a modification of my invention particularly adapted for use on light airplanes. In this embodiment, the wheel 90 is rotatably mounted on an axle 91 which is functionally integral with a strut 92. The strut 92 is rotatably mounted in a cap 93 which is pivotally secured to a horizontal bracket 94 fixed on the body 95 of the airplane. A second strut 96 is pivotally secured at one end to the horizontal bracket 97 likewise secured to the body 95 of the airplane and is provided at its outer end with a bearing 98 for the strut 92. A strut or cable 99 secured to a projection 100 on the bearing 98 yieldably resists rotation of the struts 92 and 96 on the horizontal brackets 94 and 97 to cushion the shock of landing.

As shown in Figures 11 and 12, the axis of rotation of the strut 92 is inclined upwardly and rearwardly from the axis of rotation of the wheel 90 on axial 91. Thus the projection of the axis of rotation of the strut 92 meets the ground forwardly and outwardly of the wheel 90 and intersects the axis of rotation of the wheel inwardly of the plane of the wheel. The wheel 90 would therefore normally tend to turn inward toward the axis of the airplane (clockwise in Figure 11 and to the left in Figure 12) and would turn outward away from the axis of the airplane only when subjected to side stress coming from right to left in Figures 11 and 12.

In order to prevent the normal tendency of the wheel 90 to turn inward toward the axis of the airplane, a stop 101 is secured to the strut 92 by a pin 102 and engages the strut 96 when the wheel 90 is parallel with the airplane axis. A resilient strip or spring 103 is also secured to the strut 92 and engages the other side of the strut 96 to turn the wheel 90 back to a position parallel to the airplane axis when it has nosed outward away from the axis because of side stresses due to yaw in landing the airplane. The mounting is, in effect, a caster with the caster axis inclined forwardly and outwardly.

The purpose of providing a caster axis which is sloped out and downward is to have the intersection of this axis extended, with the ground, outside of the point of contact of the wheel with the ground so that the application of brakes on the wheel will provide a nosing-in moment about the caster axis because the braking effect takes place at the point of contact of the wheel with the ground which point is inside the point of contact of the extended caster axis with the ground. A clockwise or nosing-in moment will therefore result in the mounting shown in Figure 11. It is also desirable as will be apparent hereafter that the intersection of this inclined caster axis with the centerline of the wheel be properly located relative to the center plane of the wheel.

The purpose of providing at the same time a caster axis which slopes forward and downward is to provide an instability moment around the caster axis which will come into play when the wheel is castered outwardly and will be of such direction as to tend to cause the wheel to nose out. This instability moment is zero when the wheel is in the straight ahead position and rapidly increases as the wheel is nosed out. Even if the nosing-out moment more than counter balances the nosing-in moment so that the direction of the side load on the wheel is reversed, this fact would not prevent satisfactory operation because drag on the inside of the down-wind wheel opposes the tendency of the airplane to swing or spin into the wind.

It will be apparent from the foregoing description that when the wheel is in its straight ahead position there will be a nosing-in moment due to the weight of the airplane which will oppose any tendency of the wheel to nose out due to any force acting rearwardly on the axle such as would result from the roll up loads on initial contact with the ground and from rolling over obstacles. It will also be apparent that when the wheel is rotated outwardly, the nosing-in moments will be opposed by the nosing-out moments and gradually be completely or more than completely compensated. During the first part of the outward rotation, the unbalance of turning moments will require inwardly directed side load on the tire for equilibrium. As the resultant of the moments approaches zero this side load will also approach zero and, when the result is reversed in direction, the side load on the tire will also reverse and be directed outwardly.

The magnitude of the tire side loads required for equilibrium and the point at which they reverse can be controlled by the proper relationship between the forward slope of the caster axis and the distance from its intersection with the horizontal plane of the wheel axle to the center plane of the wheel.

It will be apparent to those skilled in the art that the axis could be made to pass through the point of intersection of the wheel axis with the wheel center plane and accomplish all of the purposes of my invention. In this embodiment rearwardly directed forces applied to the axle would provide no turning moment and the need for counter balancing nosing-in moment would vanish.

From the foregoing, it will be apparent that I am able to attain the objects of my invention and provide a new and improved undercarriage for airplanes. This undercarriage may be embodied in a variety of structures and applied to any type of airplane. I have shown and described several forms my invention may take but these forms are to be considered as illustrative only and not as limiting the scope of my invention. Various further modifications and changes can of course be made without departing from the spirit of my invention.

This application is a continuation in part of my prior applications Serial No. 61,980, filed November 26, 1948, for Cross Wind Airplane Undercarriage, and Serial No. 114,880, filed September 9, 1949, for Cross-Wind Undercarriages, both now abandoned.

In the following claims the term caster is used to denote the turning of a wheel about a substantially vertical axis to attain rolling alignment of the wheel with the direction of motion of the body which it supports.

I claim:

1. In an airplane having two main wheels positioned one on each side of the axis of the airplane, a main wheel mounting comprising a support carried by said airplane, a member vertically slidably and rotatably mounted in said support, resilient means resisting the sliding movement of said member, a fork secured to said member and extending downwardly and rearwardly therefrom, a wheel rotatably mounted in said fork, a stop for limiting rotation of said fork relative to said support in one direction to prevent said wheel from nosing in toward said axis and means for yieldably resisting rotation of said fork relative to said support in the other direction.

2. In an airplane undercarriage having two main wheels and a third wheel, a main wheel mounting comprising a spindle rotatably mounted on said airplane for rotation on an axis extending outwardly, forwardly and downwardly from said airplane, a normally horizontal axle functionally integral with the outer end of said spindle and a wheel mounted on said axle.

3. In an airplane undercarriage as defined in claim 2, a stop for limiting rotation of said spindle in one direction to prevent said wheel from nosing in toward the airplane.

4. In an airplane undercarriage as defined in claim 2, a stop for limiting the rotation of said spindle in one direction to prevent said wheel from nosing in toward the airplane and means for yieldably resisting rotation of said spindle in the other direction.

5. In an airplane undercarriage as defined in claim 2, horizontal hinge means connecting said spindle to the airplane and means for yieldably resisting swinging movement of said spindle on said hinge.

6. In an airplane having two main wheels positioned one on each side of the axis of the airplane, a main wheel mounting comprising a support carried by said airplane, a member vertically slidably and rotatably mounted in said support, resilient means resisting the sliding movement of said member, a fork secured to said member and extending downwardly and rearwardly therefrom, a wheel rotatably mounted in said fork, and a jack-knife mounting interconnecting said support and said fork for limiting rotation of said fork relative to said support, said jack-knife mounting comprising a framework pivotly secured to said support for movement on a horizontal axis, two links universally secured on opposite sides of said fork and universally secured on opposite sides of the free end of said frame, one of said links being extensible and resilient means resisting extension of said one of said links.

7. In an airplane having two main wheels positioned one on each side of the axis of the airplane, a main wheel mounting comprising a support carried by said airplane, a member vertically slidably and rotatably mounted in said support, resilient means resisting the sliding movement of said member, a fork secured to said member and extending downwardly and rearwardly therefrom, a wheel rotatably mounted in said fork, and a jack-knife mounting interconnecting said support and said fork for limiting rotation of said fork, said jack-knife mounting comprising a framework pivotly secured to said support for movement on a horizontal axis, a link universally secured at one end to one side of said fork and at its other end to one side of the free end of said frame, a second link universally secured at one end to the other side of said fork and at its other end to the other side of the free end of said frame, said second link comprising two telescoping sections, stop means for limiting the telescoping movement of said sections in one direction and resilient means resisting telescoping movement of said sections in the other direction.

8. A landing gear for an airplane having a longitudinal centerline, said landing gear comprising ground engaging wheels mounted for caster movement about substantially vertical axes spaced laterally outward of said airplane centerline, stop means on each caster mounting, said stop means each comprising one part moveable with the wheel about the said axis and another part fixed in relation to the airplane structure and adapted to be engaged by the moveable part, said parts being so constructed and so related that the wheel is limited in its pivotable movement to movement between a plane parallel to the airplane centerline and a plane angularly related thereto, said last mentioned plane intersecting said centerline rearwardly of said wheels.

9. In combination in an airplane having a centerline, an air frame, main ground engaging wheels located to the right and left of said centerline for the support of said airplane on the ground, mountings for said wheels for castering action thereof, means operatively associated with the mounting of the wheel to the left of said centerline limiting its castering action to anticlockwise rotation away from a position of parallelism with said centerline, and means operatively associated with the mounting of the wheel to the right of said centerline limiting its castering action to clockwise rotation away from a position of parallelism with said centerline.

10. An airplane undercarriage including laterally spaced main ground engaging wheels, caster mountings for said wheels so constructed that said wheels can swing inwardly around substantially vertical axes in response to inwardly directed forces applied to said wheels at their points of contact with the ground, and means operatively associated with said mountings preventing said wheels from swinging outwardly around said axes in response to outwardly directed forces applied to said wheels at said points of contact with the ground.

11. An airplane undercarriage including laterally spaced main ground engaging wheels, caster mountings for said wheels, said caster mountings being so constructed that said wheels can yield by caster action to inwardly directed forces applied at their points of contact with the ground, and means operatively associated with said mountings preventing said wheels from yielding by caster action to outwardly directed forces applied at said points of contact with the ground.

12. In an airplane having two main ground engaging wheels symmetrically spaced on each side of the longitudinal axis of the airplane, a caster mounting for each main wheel, and means urging said wheels into positions parallel with said longitudinal axis, said means comprising stop means preventing said wheels from nosing inward toward said longitudinal axis and other means resiliently restraining said wheels from nosing outward from said longitudinal axis.

13. A means for centering castered airplane wheels comprising stop means, said stop means comprising one part adapted to be fixed relative to the airplane structure and one part fixed relative to the wheel and so located that it contacts the first mentioned part when the wheel is in its centered position, and means yieldably holding said parts in contact with each other.

14. In a cross wind undercarriage for airplanes, the combination of a casterable downwind wheel and a non-casterable upwind wheel.

15. The method of limiting the total side load on airplane tires in drift landings consisting of permitting the downwind wheel to toe out and preventing the upwind wheel from toeing in.

JOHN HARLIN GEISSE.

REFERENCES CITED

The following references are of record in the file of this patent:

UNITED STATES PATENTS

| Number | Name | Date |
| --- | --- | --- |
| 2,477,881 | King | Aug. 2, 1949 |
| 2,529,932 | Geisse | Nov. 14, 1950 |

FOREIGN PATENTS

| Number | Country | Date |
| --- | --- | --- |
| 883,921 | France | Apr. 5, 1943 |